(12) United States Patent
Mickelson et al.

(10) Patent No.: US 6,921,084 B2
(45) Date of Patent: Jul. 26, 2005

(54) HIGH STRENGTH CRACK-RESISTANT ARMOR MATERIAL IN A CYLINDER HEAD GASKET

(75) Inventors: Michael L. Mickelson, Gurnee, IL (US); Robert M. Reisel, Arlington Heights, IL (US); Gregory J. Barclay, Mt. Prospect, IL (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 233 days.

(21) Appl. No.: 10/373,401

(22) Filed: Feb. 24, 2003

(65) Prior Publication Data
US 2003/0173747 A1 Sep. 18, 2003

Related U.S. Application Data
(60) Provisional application No. 60/359,547, filed on Feb. 25, 2002.

(51) Int. Cl.[7] ............................................. F02F 11/00
(52) U.S. Cl. ........................ 277/594; 277/591; 277/595
(58) Field of Search .................. 277/591, 594, 277/595, 600, 601, 313

(56) References Cited

U.S. PATENT DOCUMENTS

| 3,565,449 | A | * | 2/1971 | Brockhaus et al. ......... 277/601 |
|---|---|---|---|---|
| 4,369,980 | A | * | 1/1983 | Backlin ...................... 277/593 |
| 4,376,539 | A | * | 3/1983 | Baldacci ..................... 277/313 |
| 5,039,117 | A | * | 8/1991 | Gohrlich et al. ............ 277/591 |
| 5,226,662 | A | | 7/1993 | Justus |
| 5,280,929 | A | * | 1/1994 | Miyaoh et al. ............. 277/595 |
| 5,340,126 | A | * | 8/1994 | Antonini et al. ............ 277/601 |
| 5,603,515 | A | * | 2/1997 | Bock .......................... 277/591 |
| 5,722,670 | A | | 3/1998 | Novak et al. |
| 5,772,215 | A | | 6/1998 | West |
| 5,873,578 | A | | 2/1999 | Jargeaix |
| 5,895,057 | A | | 4/1999 | Rosenquist |
| 5,934,682 | A | | 8/1999 | Miszczak et al. |
| 5,970,612 | A | | 10/1999 | West |
| 6,113,109 | A | | 9/2000 | Lieb et al. |
| 6,210,500 | B1 | | 4/2001 | Zurfluh |

* cited by examiner

*Primary Examiner*—Alison Pickard
*Assistant Examiner*—Enoch Peavey
(74) *Attorney, Agent, or Firm*—Howard & Howard

(57) ABSTRACT

A cylinder head gasket includes a main gasket body having at least one cylinder opening, a wire sealing ring, and a metal armoring ensheathing the wire sealing ring. The metal armoring has a first annular flange portion extending beyond the cylinder opening in overlying relation to a first main surface of the main gasket body, a second flange portion opposite the first flange portion having a size no greater than that of the cylinder opening, and a curved portion joining the first and second flange portions. The cylinder opening is notched to receive lock tabs of the second flange portion through the main body, after which the metal armoring is rotated to offset the lock tabs from the notches to lock the armoring and sealing ring within the cylinder opening.

9 Claims, 2 Drawing Sheets

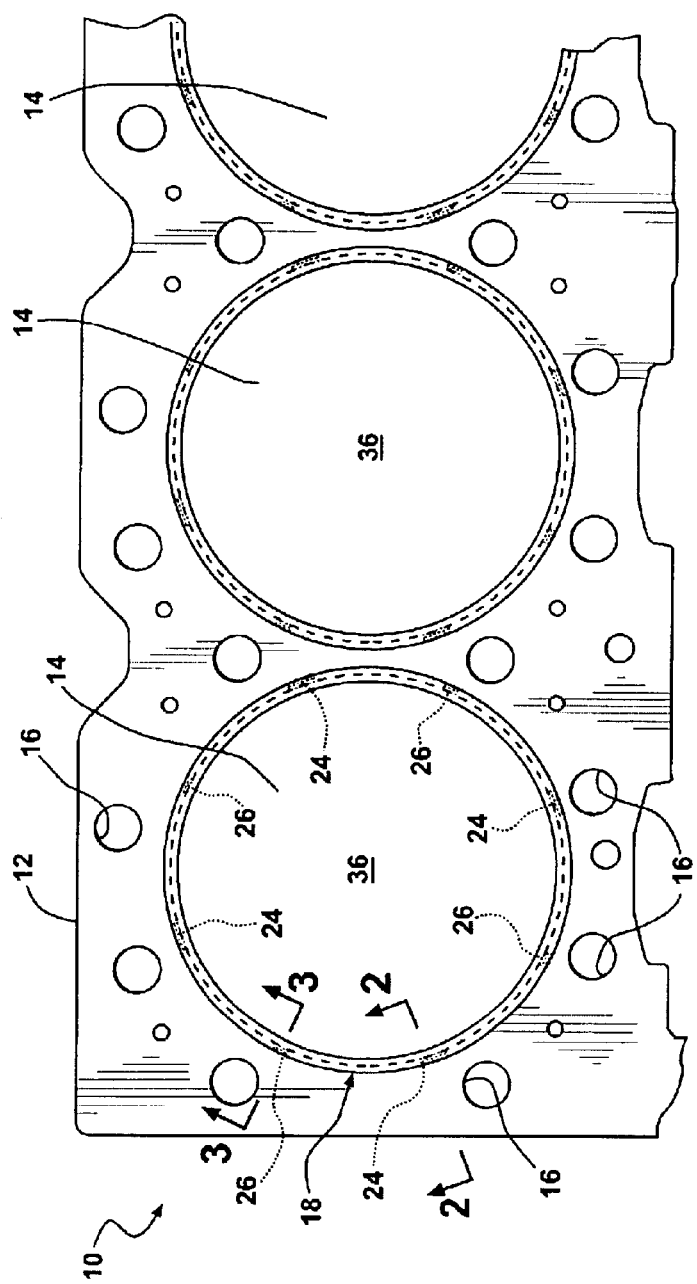
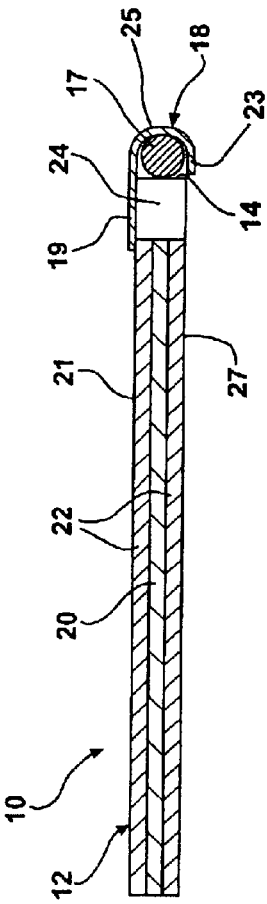
FIG-1
FIG-2

HIGH STRENGTH CRACK-RESISTANT ARMOR MATERIAL IN A CYLINDER HEAD GASKET

This application claims the benefit of U.S. Provisional Application No. 60/359,547, filed Feb. 25, 2002.

BACKGROUND OF THE INVENTION

1. Technical Field

This invention generally relates to cylinder head gaskets. With more particularity, this invention relates to cylinder head gaskets having a high strength armor positioned around cylinder head openings.

2. Related Art

It is known in the art to manufacture cylinder head gaskets having armoring and wire rings at the combustion openings to provide sealing of the combustion cylinders.

Typically, the gasket includes a main body which may be a laminate including a metal core and a pair of facing sheets. The facing sheets may be made of various materials including various plastic and glass fibers, as well as graphite.

The armoring included around the cylinder openings of the gasket generally comprises an annular body of a metallic material in which a wire ring is positioned. The armoring is bent around the wire ring in the manufacturing process and then disposed around the combustion openings, wherein they are permanently attached to the gasket.

Conventional materials used for armor have limitations as to the strength of the material, due to the fact that the armor material needs to be bent around the wire ring in a manufacturing process. Therefore, suitable armor materials should have an elongation that would allow for the bending of the armor material around the wire ring.

Another difficulty with such armoring is that once wrapped about the wire ring, it is necessary to secure the armoring and ring to the gasket body to line the cylinder openings. The preformed armoring presents challenges to the securement of the armoring to the gasket body.

It is an object of the present invention to overcome or greatly minimize the foregoing limitations.

SUMMARY OF THE INVENTION

A cylinder head gasket includes a main gasket body having at least one cylinder opening, a wire sealing ring, and a metal armoring ensheathing the wire sealing ring. The metal armoring has a first annular flange portion extending beyond the cylinder opening in overlying relation to a first main surface of the main gasket body, a second flange portion opposite the first flange portion having a size no greater than that of the cylinder opening, and a curved portion joining the first and second flange portions. The cylinder opening is notched to receive lock tabs of the second flange portion through the main body, after which the metal armoring is rotated to offset the lock tabs from the notches to lock the armoring and sealing ring within the cylinder opening.

THE DRAWINGS

These and other features and advantages of the present invention will become more readily appreciated when considered in connection with the following detailed description and appended drawings, wherein:

FIG. 1 is a fragmentary plan view of a cylinder head gasket embodying the present invention;

FIG. 2 is an enlarged cross-sectional view taken generally along the lines 2—2 of FIG. 1;

DETAILED DESCRIPTION OF THE PREFERRED EMBODIMENT

Figure 3:
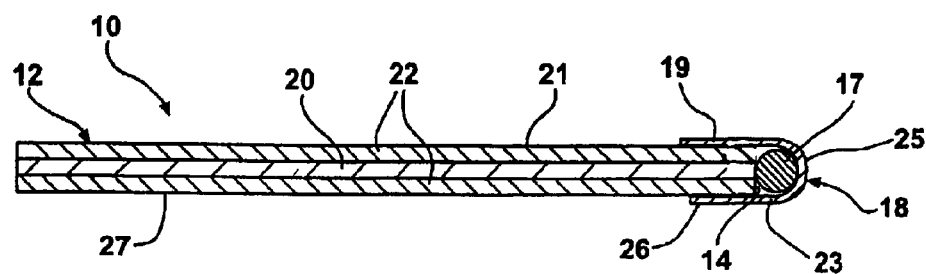
FIG. 3 is an enlarged cross-sectional view taken along lines 3—3 of FIG. 1.

With reference to FIG. 1, a cylinder head gasket 10 of the present invention includes a generally planar main gasket body 12 which defines a plurality of cylinder head openings 14, as well as bolt openings 16 and other openings including oil and coolant passages. An armoring material 18 is positioned around the cylinder openings 14.

The main gasket body 12 typically may include a laminate material, such as a solid metallic core having a pair of facing sheets 22. The metallic core 20 is preferably made of steel. The facing sheets 22 typically are made of a softer facing material than that of the steel core 20. Suitable facing materials include: glass, aramid, or other fibers. It may also include nitrile, neoprene, or other polyacrylic elastomers to form the facings. Graphite facing sheets are also known in the art and may also be used by the present invention. Typically, the facing sheets are attached to the steel core with adhesives or by mechanical operations such as clinching as well known in the art.

The main gasket body 12 may be die cut or blanked, such as with a stamping operation or punch press to provide the cylinder openings 14, as well as a plurality of fluid openings 16. With reference to FIGS. 1 and 3, the gasket body 12 also includes slots 24 positioned circumferentially around the cylinder openings 14 that are utilized to locate and position the armor 18, which will be described in more detail below.

With reference to FIGS. 1 and 2, the armor 18 is positioned around the cylinder openings 14 to provide a sealing of the cylinder opening 14. With reference to FIGS. 2 and 3, the armor 18 is generally shaped to form an annular body around an annular wire sealing ring 17. The armor 18 is generally U-shaped in cross-section and is formed around the wire ring 17. The ring 17 may be made of copper, or the like, and is compressed during sealing.

The armor 18 has a first annular flange portion 19 extending radially outwardly beyond the edge of the cylinder opening 14 in the main gasket body 12 in overlying relation to a first main surface 21 of the main gasket body 12 and being circumferentially continuous (FIGS. 1–3). The armor 18 has a second annular flange portion 23 disposed opposite the first annular flange portion 19 but extending radially outwardly no further than the edge wall of the cylinder opening 14 in the main gasket body 12 (FIG. 2). The second annular flange is circumferentially continuous. An annular curved portion 25 joins the first and second flange portions 19, 23.

During the manufacturing process, the armor material 18 needs to have a sufficient elongation to allow for the deformation of the armor material into the U-shaped cross-section as shown in FIGS. 2 and 3. Typically, an elongation of from 30 to 50 percent, and even more preferably of 40 percent is required for the armor material to be formed without cracking. Materials having an elongation within the range of 30 to 50 percent, do not exhibit a sufficiently high yield strength needed for use at an armor material in the subject gasket application. After the armor material 18 has been deformed around the wire ring 26, the subassembly of the armor material 18 and wire ring 26 is heat treated to increase the yield strength of the armor material 18 to a usable level for armoring.

Suitable materials that exhibit the desired elongation characteristics, as well as the needed increase in yield strength following a heat treatment include 420 and 430 stainless steel. preferably, the heat treatment involves quenching and tempering the armor material to increase the yield strength to at least 100,000 psi. In comparison, this yield strength is double that of currently known armor materials, which exhibit yield strengths of about 40,000 psi.

Figure 4:
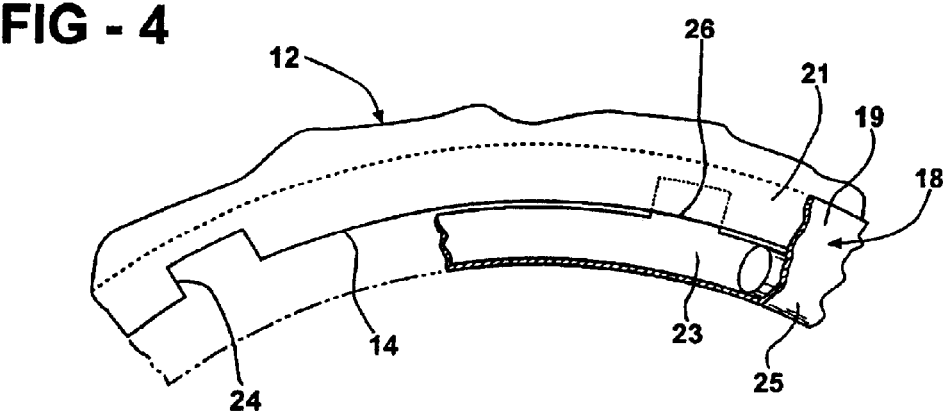
FIG. 4 is an enlarged fragmentary plan view of the gasket of FIG. 1.

As referenced above, the gasket 12 includes circumferentially spaced, radially outwardly extending slots or notches 24 formed around the periphery of the cylinder openings 14. The slots are designed such that they accommodate lock tabs 26 formed on the armor 18. The tabs 26 formed on the armor material 18 provide a location and locking feature such that the armor rings 18 are placed and supported in predetermined positions. The lock tabs 26 are circumferentially spaced in coordination with the circumferential spacing of the notches 24 of the main gasket body 12 (FIG. 1). The lock tabs 26 extend from the second annular flange portion 23 radially outwardly beyond the edge of the cylinder opening 14 in the main gasket body 12 (FIGS. 3 and 4). When mounting the armor rings 18 onto the gasket body 12, the tabs 26 are circumferentially aligned and inserted into the corresponding slots 24, and the armor 18 is then rotated about a center point 36 corresponding to the center of the cylinder opening 14 in either a clockwise or counterclockwise direction. Such rotation moves the lock tabs 26 out of alignment with the slots 24 to position the tabs 26 in overlapping relation to a second main surface 27 of the main body portion 12 (FIGS. 3 and 4). The offset slots and tabs may be used in combination with other fastening operations, such as welding or clinching to permanently attach the armor 18 to the main body of the gasket 12. Alternatively, the offset slot and tab arrangement of the armor 18 and gasket 12 may be utilized as the sole source of attaching the armor 18 to the main body of the gasket 12.

The slots 24 are covered completely on the first main surface 21 by the first annular flange portion 19 when the armor 18 is rotated to the locked position (FIGS. 1, 2 and 4). The tabs 26 may be elastically biased against the second main surface 22 of the main body portion 12. The elastic bias may be provided by setting the spacing between the tabs 26 and the first flange portions 19 to be slightly less in the relaxed state than the thickness of the main body portion 12 engaged by the first annular flange portion 19 and lock tabs 26 when rotated to the locked condition.

Figure 5:
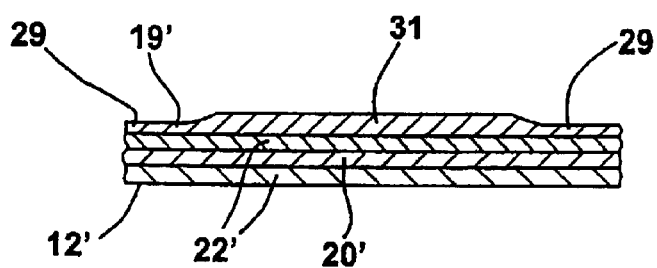
FIG. 5 is an enlarged fragmentary section view circumferentially of a cylinder opening of the gasket illustrating an alternative variable thickness armoring in exaggerated fashion.

FIG. 5 shows an alternative construction of the gasket in which the first flange 19 is formed in the circumferential direction with a variable thickness, providing relatively thin regions 29 preferably adjacent the bolt holes 16, and relatively thick regions 21 in locations away from the bolt holes 16 to compensate for variation in clamping forces applied adjacent to and away from the bolt hole regions.

Obviously, many modifications and variations of the present invention are possible in light of the above teachings. It is, therefore, to be understood that within the scope of the appended claims, the invention may be practiced otherwise than as specifically described. The invention is defined by the claims.

What is claimed is:

1. A cylinder head gasket for an internal combustion engine adapted to be positioned between a cylinder head and an engine block for seating at least one combustion cylinder, said gasket comprising:

a main gasket body having first and second main surfaces and at least one cylinder opening corresponding to the combustion cylinder of the engine;

a wire sealing ring disposed in said at least one combustion opening;

metal armoring ensheathing said wire sealing ring, said armoring comprising an annular body of metal formed separately from said main gasket body and which is generally U-shaped in cross section, said armoring having a first annular flange portion projecting radially outwardly beyond said cylinder opening in overlying relation to said first main surface, a curved portion wrapped about said wire sealing ring, and a radially outwardly directed second annular flange portion extending beneath said wire sealing ring opposite said first flange portion and terminating short of said cylinder opening of said main gasket body adjacent said second surface of said main gasket body;

a plurality of circumferentially spaced lock tabs projecting radially outwardly from said second annular flange portion in overlapping relation to said main gasket body; and a plurality of circumferentially spaced edge slots formed in said main gasket body communicating with said at least one cylinder opening in circumferentially offset relation to said locking tabs.

2. The gasket of claim 1 wherein said slots extend through to said first and second main surfaces of said main gasket body.

3. The gasket of claim 2 wherein said spacing of said slots relative to one another corresponds to said spacing of said locking tabs relative to one another.

4. The gasket of claim 3 wherein said slots are sized to receive said tabs, enabling said tabs to be aligned with and extended through said slots from said first main side of said main gasket body and thereafter rotated with said sheathing into said underlying relation to said second main surface in said circumferentially offset relation to said slots.

5. The gasket of claim 1 wherein at least one of said locking tabs is elastically biased against said second main surface.

6. The gasket of claim 5 wherein said at least one tab underlies said first annular flange portion.

7. The gasket of claim 1 wherein said edge slots are covered on said first main surface of said main gasket body by said first annular flange portion of said metal armoring.

8. The gasket of claim 1 wherein said metal armoring has a yield strength of at least 100,000 psi.

9. A method of fabricating a cylinder head gasket for an internal combustion engine adapted to be positioned between a cylinder head and an engine block for sealing at least one combustion cylinder, said method comprising:

preparing a main gasket body having first and second main surfaces and at least one cylinder opening corresponding to the at least one combustion cylinder of the engine;

forming a plurality of circumferentially spaced notches in the main gasket body communicating with and extending radially outwardly of the at least one cylinder opening in the main gasket body;

providing a metal sealing ring forming a metal arming about the metal sealing ring for lining the at least one cylinder opening having an annular body with a generally U-shaped cross section including a first annular portion and an annular curved portion joining the first and second flange portions;

forming the second annular flange portion to include a plurality of lock tabs projecting radially outwardly from the second annular flange away from the curved portion; and aligning the lock tabs of the second annular flange with the notches of the main gasket body and extending the lock tabs through the notches from the first main surface to the second main surface, and rotating the metal armoring to move the lock tabs out of alignment with the notches to lock the metal armoring and metal sealing ring in engagement with the main gasket body.

* * * * *